United States Patent
Murata

(10) Patent No.: US 6,523,663 B2
(45) Date of Patent: Feb. 25, 2003

(54) CLUTCH DRUM

(75) Inventor: Ikuo Murata, Neyagawa (JP)

(73) Assignee: Exedy Corporation, Neyagawa (JP)

( * ) Notice: Subject to any disclaimer, the term of this patent is extended or adjusted under 35 U.S.C. 154(b) by 0 days.

(21) Appl. No.: 09/845,214

(22) Filed: May 1, 2001

(65) Prior Publication Data

US 2001/0047917 A1 Dec. 6, 2001

(30) Foreign Application Priority Data

May 26, 2000 (JP) .......................................... 2000-155614

(51) Int. Cl.⁷ ............................................. F16D 13/60
(52) U.S. Cl. ....................................... 192/70.2; 74/434
(58) Field of Search ........................... 192/70.2, 85 AA, 192/112, 115; 74/434

(56) References Cited

U.S. PATENT DOCUMENTS

| 4,997,073 A | * | 3/1991 | Fujioka et al. | ............... 192/70.2 |
| 6,095,006 A | * | 8/2000 | Morita et al. | ................. 74/434 |

FOREIGN PATENT DOCUMENTS

| JP | 4-125317 A | * | 4/1992 | ................ 192/70.2 |
| JP | 2000-205294 A | * | 7/2000 | |
| JP | 2000-218334 A | * | 8/2000 | |

\* cited by examiner

*Primary Examiner*—Richard M. Lorence
(74) *Attorney, Agent, or Firm*—Shinjyu Global IP Counselors, LLP

(57) ABSTRACT

A clutch drum 15 is configured to reduce the weight of a clutch drum while keeping the mechanical losses of the clutch drum 15 in check. The clutched drum 15 houses several clutch plates 17 and has a cylindrical part 23 and a plurality of the teeth 25 that are arranged circumferentially around the inside of the cylindrical part 23 and extend in the axial direction. The teeth 25 have tooth cusps 29 and tooth flanks 31 on both rotational-direction sides. Bottom lands 35 are formed on the inside surface of the cylindrical part 23 between the teeth 25 in the axial direction. The outside recesses 37 are formed on the portions of the outside surface of the cylindrical part 23 that correspond to the teeth 25 and the inside recesses 27 are formed on the inside surfaces of the teeth 25.

11 Claims, 3 Drawing Sheets

CLUTCH DRUM

BACKGROUND OF THE INVENTION

1. Field of the Invention

This invention generally relates to a clutch drum. More specifically, the present invention relates to a clutch drum for a multiple plate clutch that houses a plurality of clutch plates.

2. Background Information

The transmissions used in automatic automobiles are often equipped with multiple plate wet clutches. Multiple plate clutches are typically equipped with a clutch drum, a piston, a plurality of drive plates, a plurality of driven plates, and an output member. The clutch drum is a cylindrical member, with one end open and the other end substantially closed. The clutch drum is fixedly coupled to an input shaft which receives torque from the engine. The piston is arranged so that it can move freely in the axial direction within the clutch drum. The drive plates and the driven plates are arranged within the clutch drum so as to alternate in the axial direction. The drive plates mate with the inside circumferential surface of the clutch drum in such a manner that they can move freely in the axial direction but cannot undergo relative rotation. The driven plates mate with the outside surface of the output member in such a manner that they can move freely in the axial direction but cannot undergo relative rotation.

With this kind of multiple plate clutch, when the clutch is engaged, hydraulic pressure is supplied to the piston to move the piston in the axial direction by the operating fluid. As a result, the drive plates and the driven plates are pressed together by the piston. Thus, the drive plates and, the driven plates can rotate as a single unit and the torque from the engine is transmitted to the transmission. Specifically, the torque from the engine is transmitted to the transmission through the following components in order as listed: the input shaft, the clutch drum, the drive plates, the driven plates, and the output member.

The clutch drum in this type of multiple plate clutch generally has a cylindrical part with a plurality of teeth formed on the inside of the cylindrical part. The plurality of teeth mate with the outside of the drive plates. The drive plates can move freely in the axial direction but cannot rotate with respect to the cylindrical part.

Since the plurality of teeth in this kind of clutch drum are formed so as to project inward from the inside of the cylindrical part, the drum is thicker at the locations where the teeth are formed. Consequently, the overall weight of the clutch drum increases according to the weight of the teeth. A heavy clutch drum can cause trouble during shifting because more time is required for stopping rotation of the clutch drum.

In order to resolve this problem, clutch drums have already been proposed which attempt to reduce the weight by eliminating all material except for material that forms the faces of the plurality of teeth, as shown in FIGS. 4 and 5.

As shown in FIG. 4, the clutch drum 15' is deeply recessed at the outside part of tooth 25'. Although the weight of the clutch drum 15' has been reduced, the mechanical losses are large because the agitation resistance between the drum and the operating fluid disposed on the outside thereof increases when the clutch drum 15' rotates.

On the other hand, as shown in FIG. 5, the overall weight of the clutch drum 15" is also reduced when only the tooth flanks are formed in the clutch drum 15". However, the mechanical strength of the clutch drum 15" is reduced because the majority of each tooth 25" is formed by thin walled projections. More specifically, sufficient strength cannot be secured against the stresses imposed by the drive plates in the rotational direction.

In, view of the above, there exists a need for a clutch drum which overcomes the above mentioned problems in the prior art. This invention addresses this need in the prior art as well as other needs, which will become apparent to those skilled in the art from this disclosure.

SUMMARY OF THE INVENTION

An object of the present invention is to provide a clutch drum in which the weight of the clutch drum is reduced, while maintaining the mechanical losses of the clutch drum in check.

The forgoing object of the present invention can be attained by a clutch drum that houses a plurality of clutch plates. The clutch drum includes cylindrical part and a plurality of teeth that are arranged circumferentially around the inside of the cylindrical part and extend in the axial direction. The plurality of teeth have an inner circumferential surface as well as tooth flanks on both sides in the rotational direction and the cylindrical part has bottom lands formed on its inner surface between the plurality of teeth in the rotational direction. The first recesses are formed on the portions of the outside surface of the cylindrical part that correspond to the plurality of teeth and second recesses are formed on the inside surfaces of the plurality of teeth.

With this clutch drum, when the clutch is engaged, the plurality of clutch plates move in the axial direction guided by the plurality of teeth and press against one another. As a result, torque can be transmitted between the plurality of clutch plates. Also, the plurality of teeth have more wall thickness than in conventional clutch drums because first recesses and second recesses corresponding to each of the plurality of teeth are formed in the outside surface and inside surface of the cylindrical part.

Here, since recesses are formed in both the outside surface and the inside surface of the cylindrical part, the desired weight reduction can be achieved even if the first and second recesses are each relatively small. Furthermore, the mechanical losses at the outside surface of the cylindrical part can be reduced and sufficient mechanical strength can be obtained for the clutch drum at the inside surface of the cylindrical part.

In accordance with another aspect of the present invention, the clutch drum described above preferably has the second recesses b formed so as to blend smoothly with the inside surfaces of the teeth. Here, sufficient mechanical strength is secured for the clutch drum because the wall thickness of the teeth varies smoothly in the circumferential direction.

In accordance with another aspect of the present invention, the first recesses are preferably formed so as to blend smoothly with the outside surface of the cylindrical part. Here, the agitation resistance between the outside surface of the cylindrical part and the operating fluid is lowered and mechanical losses can be reduced.

In accordance with another aspect of the present invention, the shortest distance between the first recess and a circumferential edge of the inside surface of the plurality of teeth is longer than the shortest distance between the first recess and the second recess.

In accordance with another aspect of the present invention, a reference cross sectional area S is defined as the surface area of a cross section demarcated by an outside arc that links the bottom lands in the circumferential direction, an inside arc that links the innermost edges of the plurality of teeth in the circumferential direction, and the lines obtained by extending the tooth flanks of each tooth; cross sectional area S1 is defined as the surface area of a cross section demarcated by the first recess and the outside arc; and the ratio of cross sectional area S1 to reference cross sectional area S is greater than or equal to 0.05 and less than or equal to 0.40 for each tooth.

In accordance with another aspect of the present invention, a reference cross sectional area S is defined as the surface area of a cross section demarcated by an outside arc that links the bottom lands in the circumferential direction, an inside arc that links the innermost edges of the plurality of teeth in the circumferential direction, and the lines obtained by extending the tooth flanks of each tooth; cross sectional area S2 is defined as the surface area of a cross section demarcated by the second recess and the inside arc; and the ratio of cross sectional area S2 to reference cross sectional area S is greater than or equal to 0.05 and less than or equal to 0.30 for each tooth.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
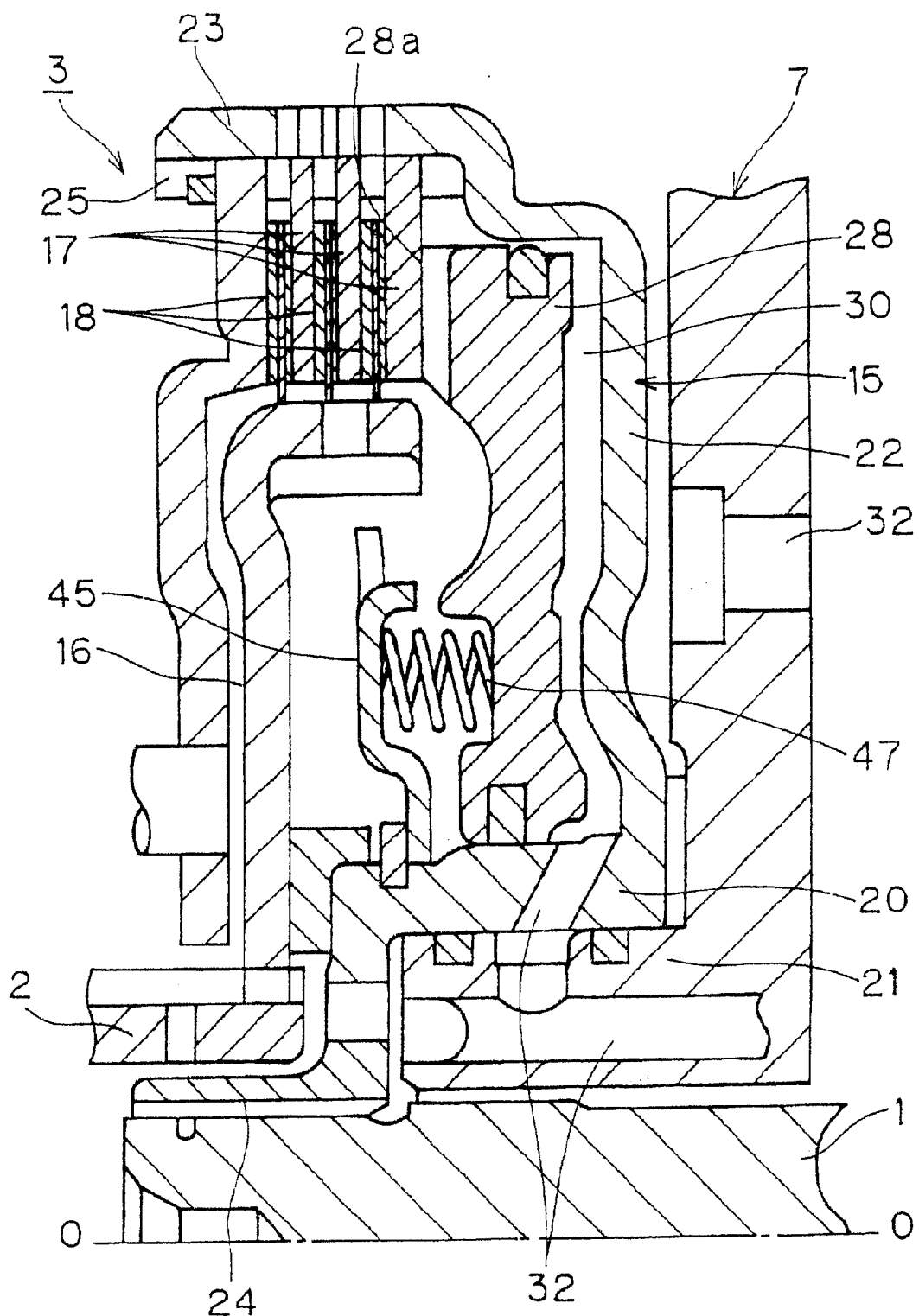
FIG. 1 is a vertical cross sectional view of a multiple plate clutch equipped with a clutch drum in accordance with a first embodiment of the present invention.

Referring initially to FIG. 1, a multiple plate clutch 3 is illustrated with a clutch drum 15 in accordance with the present invention. The multiple plate clutch 3 is housed within a clutch casing 7 and is equipped with a clutch drum 15, a plurality of clutch plates 17, a plurality of clutch disks 18, a piston 28, and an output member 16.

The clutch drum 15 is a generally cylindrical member that is substantially open on one end and substantially closed on the other end. The clutch drum 15 is provided with a coupling part 24, a boss part 20, a disk shaped radial wall part 22, a plurality of teeth 25, and a cylindrical part 23. The coupling part 24 has internal splines that engage external splines formed on the outside of an input shaft 1 that extends from the engine (not shown). The boss part 20 is supported so that it can rotate freely about a support part 21, which is formed at an inside part of the clutch casing 7 so as to project toward the output side. The outside of the boss part 20 supports a spring holding member 45 and a return spring 47.

The return spring 47 is disposed in a compressed condition between the spring holding member 45 and the piston 28. The teeth 25 are protruding portions formed so as to project inwardly from the cylindrical part 23 and extend in the axial direction. The teeth 25 are arranged adjacent to one another in the circumferential direction. The outside parts or peripheries of the clutch plates 17 mate with the teeth 25 of the cylindrical part 23.

The clutch plates 17 and the clutch disks 18 are arranged within the clutch drum 15 so as to alternate in the axial direction. The outside peripheries of the clutch plates 17 have a plurality of teeth formed thereon. These teeth of the clutch plates 17 mate with the teeth 25 of the clutch drum 15 so that the clutch plates 17 can move freely in the axial direction, but cannot rotate relative to the clutch drum 15. The inside parts or peripheries of the clutch disks 18 mate with the outside periphery of the output member 16 so that the clutch disks 18 can move freely in the axial direction, but cannot rotate relative to the output member 16.

The piston 28 is disposed between the disk shaped radial wall part 22 of the clutch drum 15 and the output member 16 in such a manner that it can move freely in the axial direction. A pushing surface 28a is formed on the output side (left side in FIG. 1) of the outside part of the piston 28 for pushing the adjacent clutch plate 17. An operating fluid chamber 30 is formed between the piston 28 and the clutch drum 15. The operating fluid chamber 30 receives a pressurized operating fluid in order to push the piston 28 toward the output side. The operating fluid chamber 30 is linked to a hydraulic pressure control mechanism (not shown) via a fluid passage 32 formed in the inside part of the clutch casing 7.

The output member 16 is preferably a ring-shaped member that is disposed on the inside peripheries of the clutch plates 17 and the clutch disks 18. As previously mentioned, the clutch disks 18 mate with the outside periphery of the output member 16. The outside periphery of the output shaft 2, which extends from the transmission (not shown), mates with the inside periphery of the output member 16 in such a manner that it can move freely in the axial direction, but cannot rotate relative to the output member 16.

Next the clutch drum 15 will be described in more detail. The explanation will focus on the cylindrical part 23 and the teeth 25 of the clutch drum 15. As mentioned earlier, the clutch drum 15 has the teeth 25 for joining the cylindrical part 23 with the clutch plates 17.

Figure 2:
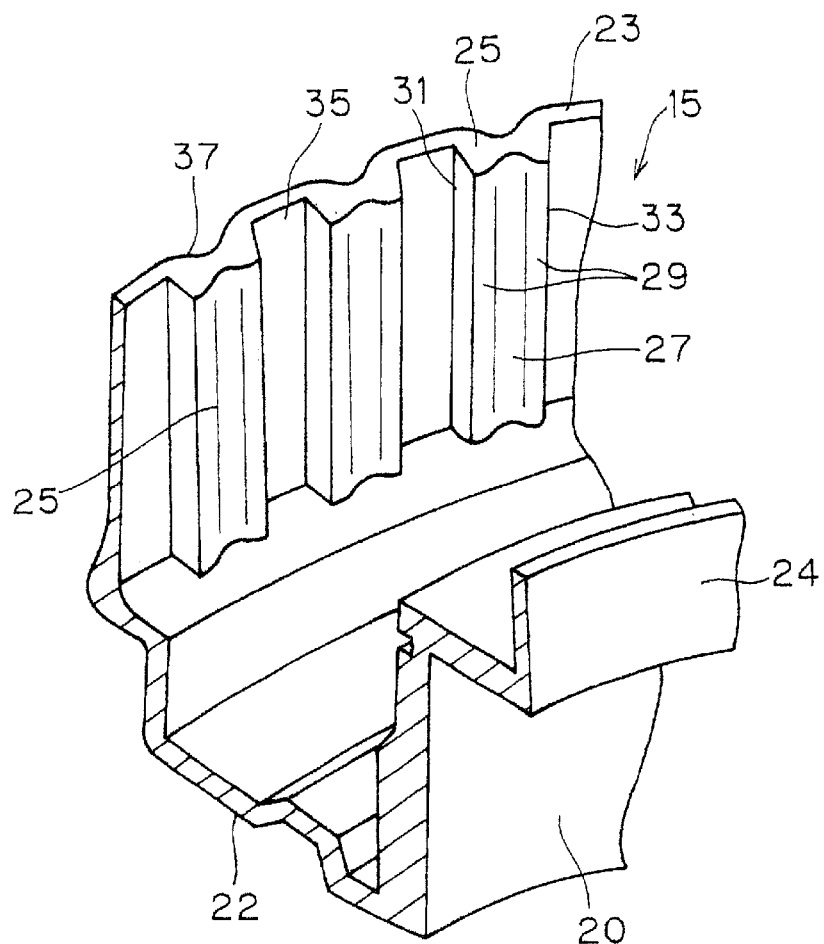
FIG. 2 is a partial perspective view of the clutch drum illustrated in FIG. 1 in accordance with a first embodiment of the present invention.
Figure 3:
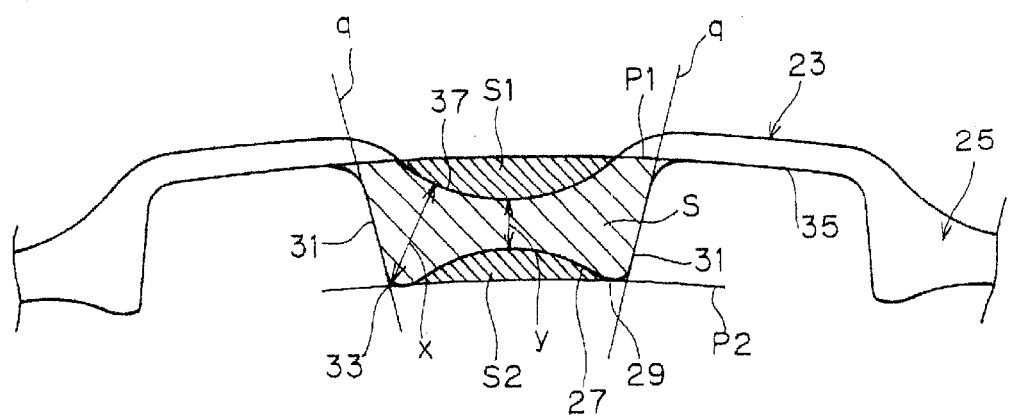
FIG. 3 is a partial edge elevational view of the clutch drum illustrated in FIGS. 1 and 2 in accordance with a first embodiment of the present invention.

As shown in FIGS. 2 and 3, the teeth 25 are circumferentially arranged in multiple locations in such a manner that the teeth 25 extend in the axial direction and are adjacently aligned in the, circumferential direction. Each of the inside surfaces of teeth 25 is provided with an inside (second) recess 27 that is formed so as to extend in the axial direction. Each of the inside recesses 27 is an axially extending groove with a curved (concaved) surface. Each of the inside surfaces of teeth 25 also includes a pair of tooth cusps 29 formed on both rotational direction sides of the corresponding inside recess 27. Preferably, the tooth cusps 29 are elongated in the axial direction and have a convexly curved surface. The inside recess 27 and the tooth cusps 29 of each tooth 25 blend smoothly (no corners or abrupt changes in direction) into one another in the rotational direction. In other words, the concavities of the inside recesses 27 are blended smoothly with the convexity of the tooth cusps 29 by curved transition surfaces that are free of any corners, abrupt changes in direction, and/or flat planar surfaces. The tooth flanks 31 are formed on both rotational direction end faces of each tooth 25. The tooth corners 33 are formed on the portion where the tooth cusps 29 intersect with the tooth flanks 31. The bottom lands 35 are formed between each tooth 25 in the rotational direction.

The outside recesses 37, which correspond to the inside recesses 27, are formed on the outside surface of the cylindrical part 23. Each of the outside recesses 37 is an axially extending groove with a curved (concaved) surface. The outside recesses 37 are formed so as to blend smoothly (no corners or abrupt changes in direction) with the outside surface of the cylindrical part 23. In other words, the concavities of the outside recesses 37 are blended smoothly with the convexity of the cylindrical part 23 by curved transition surfaces that are free of any corners, abrupt changes in direction, and/or flat planar surfaces.

Next, the design conditions of the cylindrical part 23 and the teeth 25 of this embodiment are explained based on FIG. 3. The shortest length x between the tooth corner 33 and the outside recess 37 is longer than the shortest distance y between the inside recess 27 and the outside recess 37.

The reference cross sectional area S is defined as the surface area of a region demarcated by an outside arc P1 that links the bottom lands 35 in the circumferential direction, an inside arc P2 that links the tooth cusps 29 in the circumferential direction, and a pair of extension side lines q that include the tooth flanks 31. The cross sectional area S1 is defined as the surface area of a region demarcated by the outside recess 37 and the outside arc P1. The ratio of the cross sectional area S1 to the reference cross sectional area S is preferably greater than or equal to 0.05 and preferably less than or equal to 0.40 for each tooth 25.

Meanwhile, the cross sectional area S2 is defined as the surface area of the region demarcated by the inside recess 27 and the inside arc P2. Here, the ratio of the cross sectional area S2 to the reference cross sectional area S is preferably greater than or equal to 0.05 and preferably less than or equal to 0.30 for each tooth 25.

Next, the operation of the clutch drum 15 will be described in more detail. When hydraulic pressure is supplied from a hydraulic pressure control mechanism to the operating fluid chamber 30 via the fluid passage 32, the operating fluid pushes the piston 28 toward the output side (left side of FIG. 1) within the operating fluid chamber 30. The piston 28 moves toward the output side against the force of the return spring 47 and presses the clutch plates 17 and the clutch disks 18 against one another. Thus, the clutch plates 17 and the clutch disks 18 can rotate as a single unit and the torque from the engine is transmitted to the transmission via the following components in order as listed: the input shaft 1, the clutch drum 15, the clutch plates 17, the clutch disks 18, the output member 16, and the output shaft 2.

Figure 4:
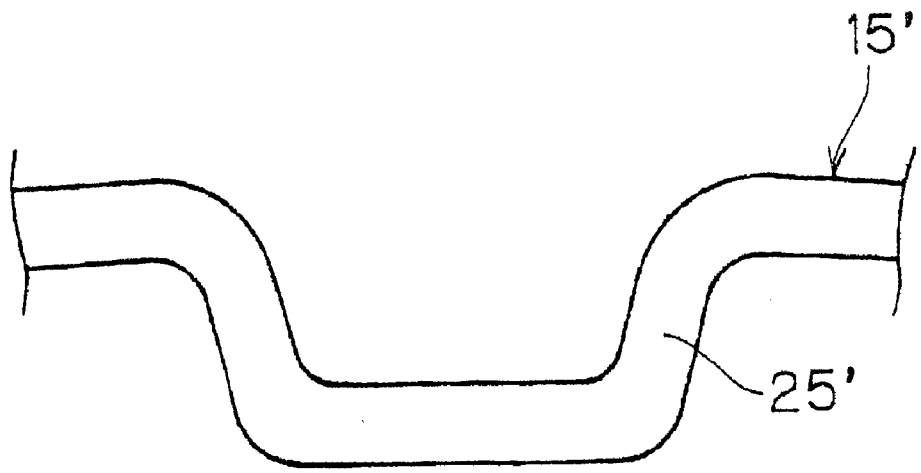
FIG. 4 is a partial edge elevational view of one type of a conventional clutch drum.
Figure 5:
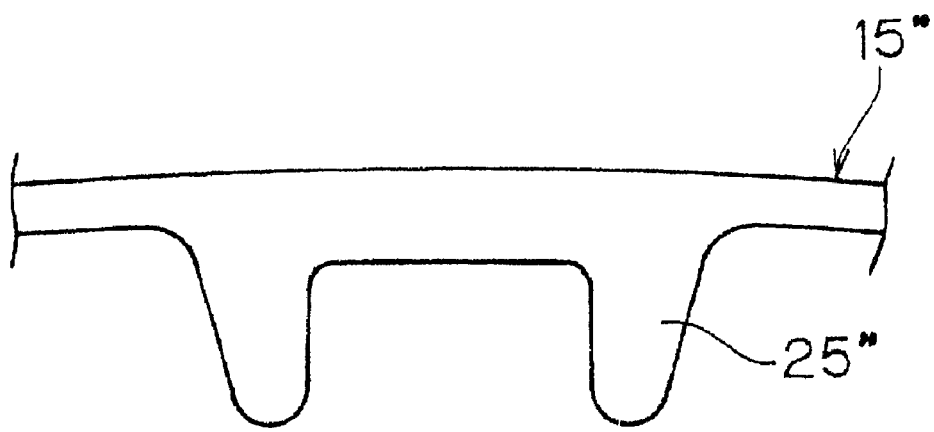
FIG. 5 is a partial edge elevational view of another type of a conventional clutch drum.

Since the clutch drum 15 is provided with the outside recesses 37 and the inside recesses 27, each tooth 25 has a portion that, is thinner than the teeth in a conventional clutch drum that is not provided with recesses. Therefore, the clutch drum 15 is lighter than such conventional clutch drums. Furthermore, since the outside recess 37 is formed so as to blend smoothly with the outside surface in the rotational direction, the agitation resistance between the outside surface of the cylindrical part 23 and the operating fluid is reduced and mechanical losses can be reduced as well. Additionally, since the recesses 27 and 37 are formed on both the inside and the outside, the desired weight reduction can be achieved while the size of each individual recess is smaller than the conventional recesses shown in FIGS. 4 and 5. Also, the agitation resistance with respect to the operating fluid can be reduced at the outside of the cylindrical part 23 and sufficient mechanical strength can be obtained for the clutch drum 15 at the inside surface of the cylindrical part 23.

Other Embodiments

The design conditions for the cylindrical part 23 and the teeth 25 are not limited to the conditions used in the previously described embodiment. Other conditions can also be used. For example, it is also acceptable to provide through holes in the teeth 25 or the bottom lands 35 that communicate between the inside and outside of the cylindrical part 23. With this arrangement, the operating fluid can be supplied from the inside to the outside, or in the reverse direction, of the cylindrical part 23.

Since the present invention is provided with recesses on both the outside and the inside of the cylindrical part 23, the desired weight reduction can be achieved even if both recesses are relatively small. Additionally, the mechanical losses of the clutch drum 15 can be held in check and the mechanical strength of the clutch drum can be ensured.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A clutch drum that houses a plurality of clutch plates, comprising:

an input part that is configured to receive an input torque;

a cylindrical part fixedly coupled to said input part, said cylindrical part having an inside surface, and an outside surface with a plurality of first recesses, said cylindrical part having a plurality of bottom lands formed on said inner surface; and a plurality of teeth circumferentially spaced around said inside surface of said cylindrical part by said plurality of bottom lands, each of said plurality of teeth having an inner end surface with a second recess and a pair of tooth flanks located on both rotational direction sides of said inner end surfaces, said first recesses being formed on portions of said outside surface of said cylindrical part that correspond to said plurality of teeth, said first recesses being continuously concave relative to said outside surface, said first recesses being formed so as to be smoothly continuous curves with said outside surface of said cylindrical part.

2. A clutch drum as recited in claim 1, wherein
said second recesses are formed as smooth continuous curves along said inner end surfaces of said plurality of teeth.

3. A clutch drum as described in claim 2, wherein
a reference cross sectional area S is defined as a surface area of a cross section demarcated by an outside arc, an inside arc and a pair of side lines intersecting said outside and inside arcs, said outside arc links an adjacent pair of said bottom lands in the circumferential direction, said inside arc links innermost edges of said plurality of teeth in the circumferential direction, and said side lines obtained by extending said tooth flanks of each of said teeth, a cross sectional area S2 is defined as a surface area of a cross section demarcated by said second recess and said inside arc, and a ratio of said cross sectional area S2 to said reference cross sectional area S is greater than or equal to 0.05 and less than or equal to 0.30 for each tooth.

4. A clutch drum as recited in claim 1, wherein
the shortest distance between said first recess and a circumferential edge of said inside surface of said plurality of teeth is longer than the shortest distance between said first recess and said second recess.

5. A clutch drum as described in claim 1, wherein
a reference cross sectional area S is defined as a surface area of a cross section demarcated by an outside arc, an inside arc and a pair of side lines intersecting said outside and inside arcs, said outside arc links an adjacent pair of said bottom lands in the circumferential direction, said inside arc links innermost edges of said plurality of teeth in the circumferential direction, and said side lines obtained by extending said tooth flanks of each of said teeth, a cross sectional area S2 is defined as a surface area of a cross section demarcated by said second recess and said inside arc, and a ratio of said cross sectional area S2 to said reference cross sectional area S is greater than or equal to 0.05 and less than or equal to 0.30 for each tooth.

6. A clutch drum that houses a plurality of clutch plates, comprising:
an input part that is configured to receive an input torque;
a cylindrical part fixedly coupled to said input part, said cylindrical part having an inside surface, and an outside surface with a plurality of first recesses, said cylindrical part having a plurality of bottom lands formed on said inner surface; and
a plurality of teeth circumferentially spaced around said inside surface of said cylindrical part by said plurality of bottom lands, each of said plurality of teeth having an inner end surface with a second recess and a pair of tooth flanks located on both rotational direction sides of said inner end surfaces,
said first recesses being formed on portions of said outside surface of said cylindrical part that correspond to said plurality of teeth, said first recesses being formed so as to be smoothly continuous curves with said outside surface of said cylindrical part, and said second recesses being formed as smooth continuous curves along said inner end surfaces of said plurality of teeth, the shortest distance between said first recess and a circumferential edge of said inside surface of said plurality of teeth being longer than the shortest distance between said first recess and said second recess.

7. A clutch drum as recited in claim 6, wherein
a reference cross sectional area S is defined as a surface area of a cross section demarcated by an outside arc, an inside arc and a pair of side lines intersecting said outside and inside arcs, said outside arc links an adjacent pair of said bottom lands in the circumferential direction, said inside arc links innermost edges of said plurality of teeth in the circumferential direction, and said side lines obtained by extending said tooth flanks of each of said teeth, a cross sectional area S1 is defined as a surface area of a cross section demarcated by said first recess and said outside arc, and a ratio of said cross sectional area S1 to said reference cross sectional area S is greater than or equal to 0.05 and less than or equal to 0.40 for each tooth.

8. A clutch drum as described in claim 7, wherein
a cross sectional area S2 is defined as a surface area of a cross section demarcated by said second recess and said inside arc, and a ratio of said cross sectional area S2 to said reference cross sectional area S is greater than or equal to 0.05 and less than or equal to 0.30 for each tooth.

9. A clutch drum as described in claim 6, wherein
a reference cross sectional area S is defined as a surface area of a cross section demarcated by an outside arc, an inside arc and a pair of side lines intersecting said outside and inside arcs, said outside arc links an adjacent pair of said bottom lands in the circumferential direction, said inside arc links innermost edges of said plurality of teeth in the circumferential direction, and said side lines obtained by extending said tooth flanks of each of said teeth, a cross sectional area S2 is defined as a surface area of a cross section demarcated by said second recess and said inside arc, and a ratio of said cross sectional area S2 to said reference cross sectional area S is greater than or equal to 0.05 and less than or equal to 0.30 for each tooth.

10. A clutch drum that houses a plurality of clutch plates, comprising:
an input part that is configured to receive an input torque;
a cylindrical part fixedly coupled to said input part, said cylindrical part having an inside surface, and an outside surface with a plurality of first recesses, said cylindrical part having a plurality of bottom lands formed on said inner surface; and
a plurality of teeth circumferentially spaced around said inside surface of said cylindrical part by said plurality of bottom lands, each of said plurality of teeth having an inner end surface with a second recess and a pair of tooth flanks located on both rotational direction sides of said inner end surfaces, said first recesses being formed on portions of said outside surface of said cylindrical part that correspond to said plurality of teeth, a reference cross sectional area S being defined as a surface area of a cross section demarcated by an outside arc, an inside arc and a pair of side lines intersecting said outside and inside arcs, said outside arc links an adjacent pair of said bottom lands in the circumferential direction, said inside arc links innermost edges of said plurality of teeth in the circumferential direction, and said side lines obtained by extending said tooth flanks of each of said teeth, a cross sectional area S1 being defined as a surface area of a cross section demarcated by said first recess and said outside arc, and a ratio of said cross sectional area S1 to said reference cross sectional area S being greater than or equal to 0.05 and less than or equal to 0.40 for each tooth.

11. A clutch drum as described in claim 10, wherein a cross sectional area S2 is defined as a surface area of a cross section demarcated by said second recess and said inside arc, and a ratio of said cross sectional area S2 to said reference cross sectional area S is greater than or equal to 0.05 and less than or equal to 0.30 for each tooth.

* * * * *